United States Patent
Okamoto et al.

(10) Patent No.: US 6,403,232 B1
(45) Date of Patent: Jun. 11, 2002

(54) ALUMINUM BRAZING SHEET

(75) Inventors: Tadashi Okamoto; Osamu Takezoe, both of Moka; Takahiko Nagaya, Gifu; Yasuaki Isobe, Nagoya; Taketoshi Toyama, Anjo; Sunao Fukuda, Handa, all of (JP)

(73) Assignees: Kobe Alcoa Transportation Products Ltd., Tokyo; Denso Corporation, Kariya, both of (JP)

( * ) Notice: Subject to any disclaimer, the term of this patent is extended or adjusted under 35 U.S.C. 154(b) by 0 days.

(21) Appl. No.: 09/911,468

(22) Filed: Jul. 25, 2001

(51) Int. Cl.[7] .............................................. B32B 15/20
(52) U.S. Cl. ...................... 428/654; 420/534; 420/535; 420/537; 420/541; 420/552; 420/553; 428/933
(58) Field of Search ................................ 428/654, 933; 420/534, 535, 537, 541, 552, 553; 148/438, 439, 440

(56) References Cited

U.S. PATENT DOCUMENTS 5,350,436 A * 9/1994 Takezoe et al. .............. 420/552
5,863,669 A * 1/1999 Miller ......................... 428/654

FOREIGN PATENT DOCUMENTS

| JP | 1-176046 | 7/1989 |
| JP | 2-37992 | 2/1990 |
| JP | 4-263033 | 9/1992 |
| JP | 8-60280 | 3/1996 |
| JP | 9-291328 | 11/1997 |

* cited by examiner

Primary Examiner—Robert R. Koehler
(74) Attorney, Agent, or Firm—Oblon, Spivak, McClelland, Maier & Neustadt, P.C.

(57) ABSTRACT

A core material of an aluminum brazing sheet restricts Mg to less than 0.3 wt % and Fe to not more than 0.2 wt %, and contains more than 0.2 wt % and not more than 1.0 wt % of Cu, 0.3 to 1.3 wt % of Si, 0.3 to 1.5 wt % of Mn and the balance of Al and inevitable impurities. A brazing filler material is formed on one surface of the core material by Al—Si based aluminum alloy. Also, a cladding material is formed on the other surface of the core material, and contains less than 0.2 wt % of Si, 2.0 to 3.5 wt % of Mg, not less than 0.5 wt % and less than 2.0 wt % of Zn and the balance of Al and inevitable impurities. Further, the value (cladding material hardness)/(the core material hardness) that is a ratio of the hardness of the cladding material to the hardness of the core material is not more than 1.5.

8 Claims, 2 Drawing Sheets

ALUMINUM BRAZING SHEET

BACKGROUND OF THE INVENTION

1. Technical Field of the Invention

The present invention relates to an aluminum brazing sheet used in a header, a side plate, etc. of an automotive radiator, and more particularly, to an aluminum brazing sheet for brazing which has high strength, high formability and excellent brazing property.

2. Description of the Related Art

Conventionally, as an aluminum brazing sheet for brazing used in a header, a side plate, etc. of an automotive radiator, Al—Mn based aluminum alloy of JIS3003 alloy, etc. as a core material, Al—Si based aluminum alloy of JIS4045 and JIS4343 alloys, etc. as a brazing filler material and Al—Zn based aluminum alloy as a cladding material serving as a sacrificial anode have been used. However, the brazing sheet comprising the core material composed of Al—Mn alloy of JIS3003 alloy, etc. has strength of about 110 MPa after the brazing so that the strength thereof is not sufficient and corrosion resistance thereof is not sufficient. Although it is effective that Mg is added to a core material in :order to improve the strength after the brazing, in a Nocolok Flux Brazing method, the brazing property of a brazing sheet in which Mg is added to a core material is significantly degraded so that it is not preferable to add Mg to the core material.

Thus, as techniques to improve strength after the brazing without degrading the brazing property, various proposals have been made as described in Japanese Patent Laid-Open Nos. Hei 4-193926, Hei 5-230577, Hei 6-145859 and Hei 6-212331, etc. Publications.

However, the prior arts described in the publications had a problem that a further thinning of the brazing sheet cannot be accomplished.

Since Si was added to a sacrificial anode cladding material for high strength in the prior art disclosed in Japanese Patent Laid-Open No. Hei 4-193926 Publication and Fe was not restricted in Japanese Patent Laid-Open No. Hei 5-230577 Publication, formability is low, and cracking tends to occur during pressing process of a header.

Since much amount of Zn were added to a sacrificial anode cladding material in Japanese Patent Laid-Open Nos. Hei 6-145859 and Hei 6-212331 Publications, formability is low, and cracking may occur during pressing process of a header.

Further, since Mn was added to a sacrificial anode cladding material for the high strength in the prior art disclosed in Japanese Patent Laid-Open No. Hei 6-212331 Publication, formability is low, and cracking tends to occur during pressing process of a header.

As described above, it was difficult to obtain a brazing sheet having all of features of strength after the brazing, brazing property and: formability in the prior arts.

However, in a heat exchanger such as an automotive radiator and a heater core, there have been demands for thinning of material to accomplish lightweight and manufacturing cost-down so that there have been also strong demands for the thinning of aluminum brazing sheet used in the brazing.

Further, the conventional high strength materials had a problem that warping or spring back is generated in case of forming or punching a plate material so that stable shape cannot be maintained.

SUMMARY OF THE INVENTION

An object of the present invention is to provide an aluminum brazing sheet having high strength after the brazing, excellent brazing property and improved formability.

An aluminum brazing sheet according to the present invention comprises a core material formed of an aluminum alloy having a composition restricting Mg to less than 0.3 wt % and Fe to not more than 0.2 wt %, and containing more than 0.2 wt % and not more than 1.0 wt % of Cu, 0.3 to 1.3 wt % of Si, 0.3 to 1.5 wt % of Mn land the balance of Al and inevitable impurities; a brazing filler material formed on one surface of the core material by Al—Si based aluminum alloy; and a cladding material formed on the other surface of said core material. Said cladding material is formed of an aluminum alloy containing less than 0.2 wt % of Si, 2.0 to 3.5 wt % of Mg, not less than 0.5 wt % and less than 2.0 wt % of Zn and the balance of Al and inevitable impurities. The ratio of (cladding material hardness)/(the core material hardness) that is a ratio of the hardness of said cladding material to the hardness of said core material is not more than 1.5.

Said core material may contain not more than 0.3 wt % of Cr, not more than 0.3 wt % of Zr or not more than 0.3 wt % of Ti. The Mg content of said core material is preferably not more than 0.1 wt %.

BRIEF DESCRIPTION OF THE DRAWINGS

The above objects, other objects, features and advantages of the present invention will be better understood from the following description taken in conjunction with the accompanying drawings, in which.

THE PREFERRED EMBODIMENTS OF THE INVENTION

Figure 1:
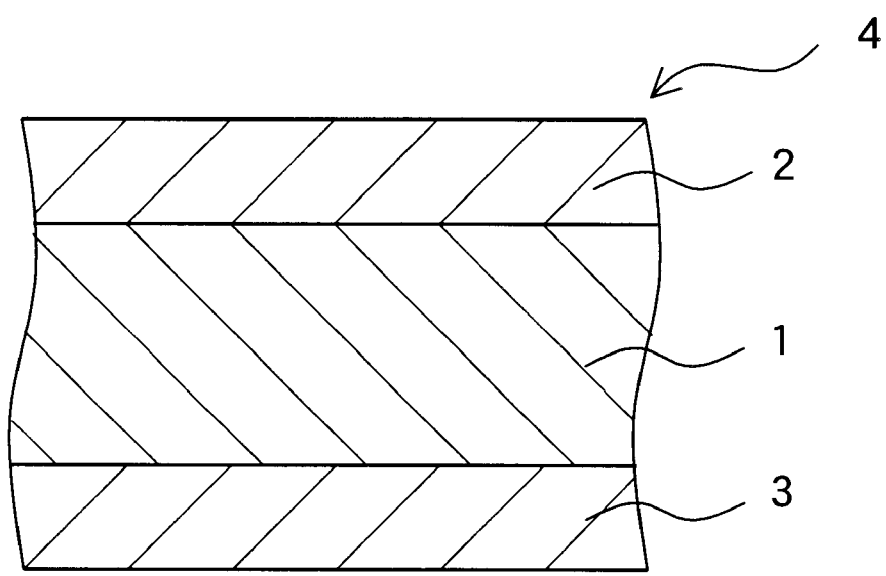
FIG. 1 is a cross sectional view showing an aluminum brazing sheet according to an example of the present invention.

The brazing sheet according to the present invention is formed by laminating a cladding material on one surface of a core material and a brazing filler material coated on the other surface of the core material. Hereinafter, the reasons for the addition of ingredients and composition limit of the core material, the cladding material and the brazing filler material of the brazing sheet material according to the present invention will be described.

(a) Core Material

Mg: Less Than 0.3 wt %

Although Mg is extremely effective element for improving the strength of the core material, if Mg is added not less than 0.3 wt %, the brazing property of the aluminum brazing sheet is degraded. Particularly, in the brazing by Nocolok Flux Brazing method, the degradation of brazing property by Mg is very significant. Thus, the Mg content is limited to less than 0.3 wt %. Preferably, the Mg content is not more than 0.1 wt % so as to further suppress the degradation of brazing property.

Cu: More Than 0.2 wt % and Not More Than 1.0 wt %

Cu is an element for improving the strength of the core material and the corrosion resistance of the brazing filler material. However, if Cu is added more than 1.0 wt %, a melting point of the core material is so reduced that workability during brazing is degraded. Further, if the Cu content is not more than 0.2 wt %, it is insufficient to improve the strength of the core material. Thus, the Cu content is defined as from 0.2 to 1.0 wt %. Also, the Cu content is preferably not less than 0.3 wt % in order to raise the strength of the core material.

Si: From 0.3 to 1.3 wt %

Si is an element for improving the strength of the core material, and according to the addition of Si, an intermetallic compound composed of $Mg_2Si$ is precipitated by reaction of Al—Si—Mn based precipitate and Mg diffused from the cladding material to improve the strength of the core material. However, if the additive amount of Si is less than 0.3 wt %, it is insufficient to improve the strength of the core material, meanwhile, if Si is added more than 1.3 wt %, the melting point of the core material is lowered, and workability during brazing becomes degraded due to increase of a phase with lower melting point. Thus, the Si content is defined as from 0.3 to 1.3 wt %.

Mn: From 0.3 to 1.5 wt %

Mn is an element for enhancing the corrosion resistance and the strength of the core material. If the additive amount of Mn is less than 0.3 wt %, it is impossible to sufficiently improve the strength of the core material. Meanwhile, if the additive amount of Mn is more than 1.5 wt %, macro intermetallic compound is formed so that processability and corrosion resistance are degraded. Thus, the additive amount of Mn is defined as from 0.3 to 1.5 wt %.

Fe: Not More Than 0.2 wt %

Since Fe refines crystal grains, the brazing property is degraded. Further, because Fe is diffused in the core material as crystallization, workability(formability) is degraded. Thus, the additive amount of Fe is defined as not more than 0.2 wt %.

Cr: Not More Than 0.3 wt %

Cr is an ingredient for enhancing the corrosion resistance, the strength and the brazing property of the core material. Although Cr is added more than 0.3 wt %, further improvement for the corrosion resistance, the strength and the brazing property cannot be expected, and the processability and corrosion resistance are degraded due to the formation of intermetallic compound. Thus, in case of adding Cr, the additive amount thereof is defined as not more than 0.3 wt %.

Zr: Not More Than 0.3 wt %

Zr is an element for improving the brazing property and the corrosion resistance by making the grain coarse. Although Zr is added more than 0.3 wt %, further improvement for the brazing property and the corrosion resistance cannot be expected, and processability and corrosion resistance are degraded due to the formation of intermetallic compound. Thus, in case of adding Zr, the additive amount thereof is defined as not more than 0.3 wt %.

Ti: Not More Than 0.3 wt %

Ti is an element for considerably improving the corrosion resistance of the core material. Although Ti is added more than 0.3 wt %, further improvement for the corrosion resistance cannot be expected, and processability and corrosion resistance are degraded due to the formation of intermetallic compound. Thus, in case of adding Ti, the additive amount thereof is defined as not more than 0.3 wt %.

(b) Cladding Material

Si: Less Than 0.2 wt %

Si improves the strength of the cladding material by precipitating $Mg_2Si$ by reaction with Mg of the cladding material serving as a sacrificial anode. However, because the addition of Si degrades the formability of the cladding material, the additive amount thereof is restricted to less than 0.2 wt %.

Mg: From 2.0 to 3.5 wt %

Mg is an element for improving the strength and the formability of the cladding material. By brazing heating, Mg added to the cladding material is diffused into the cladding material and combined with Si added to the cladding material to form $Mg_2Si$, thereby improving the strength after the brazing. If the additive amount of Mg is less than 2.0 wt %, improvement effect for the strength is little, and formability is degraded. Meanwhile, if Mg is added more than 3.5 wt %, cladding compactibility is degraded so that it becomes difficult to laminate the cladding material on the core material. Thus, the additive amount of Mg is defined as from 2.0 to 3.5 wt %.

Zn: Not Less Than 0.5 wt % and Less Than 2.0 wt %

Zn is an element for lowering the electric potential of the cladding material serving as a sacrificial anode and improving the corrosion resistance of inner face, and precipitates $MgZn_2$ by reaction with Mg of the sacrificial anode cladding material to improve the strength. If the Zn content is less than 0.5 wt %, improvement effect for the strength is little, and the corrosion resistance is degraded. Meanwhile, if Zn is added not less than 2.0 wt %, the formability of the cladding material is degraded, which is not preferable. Thus, the additive amount of Zn is defined as not less than 0.5 wt % and less than 2.0 wt %.

The ratio of (cladding material hardness)/(core material hardness) which is a ratio of the hardness of cladding material to the hardness of core material: not more than 1.5.

The hardness ratio of the cladding material to the core material affects warping and spring back after the processing. If the hardness ratio of the cladding material to the core material is larger than 1.5, the cladding material has excessively high strength comparing to the core material so that warping and spring back are generated due to stress difference after the processing. Therefore, (the cladding material hardness)/(the core material hardness) value that is a ratio of the hardness of the cladding material to the hardness of the core material is limited to not more than 1.5.

The hardness ratio of,the cladding material to the core material is adjustable by properly setting the final annealing condition. It is preferable that the final annealing temperature is set to 330 to 550° C., and then, a cooling to a room temperature is performed at a cooling rate of about 2 to 20° C./hr. In case where the cooling rate exceeds 20° C./hr, the hardness of the cladding material becomes higher than that of the core material so that the hardness ratio becomes not less than 1.5, which is not preferable. Further, a temperature raising condition during the annealing is not particularly limited.

EXAMPLE

Next, the properties of the examples according to the invention will be described compared with those of comparative examples beyond the claims.

First Experimental Test

Compositions of the core material used in the examples of the present invention and the comparative examples are shown in Table 1. In Table 1, the core material Nos. 1 to 10 are the examples of the present invention, and the core material Nos. 11 to 15 are comparative examples beyond the scope of the present invention. Further, in the core material Nos. 11 to 15, ingredients beyond the compositions of the claims of the present invention are shown with underlined.

In addition, the ingredient compositions of the cladding material used in the examples and the comparative examples of the present invention are shown in Table 2. In Table 2, the cladding material Nos. 1 to 5 are the examples of the present invention, and the cladding material Nos. 6 to 9 are the comparative examples beyond the scope of the claims of the present invention. Further, ingredients beyond the claims are shown with underlined.

TABLE 1

| Core Material No. | Composition of Core Material (mass %) | | | | | | | | | |
|---|---|---|---|---|---|---|---|---|---|---|
| | Si | Fe | Cu | Mn | Mg | Zn | Cr | Zr | Ti | Al |
| Examples | | | | | | | | | | |
| 1 | 0.4 | 0.05 | 0.5 | 1.1 | 0.00 | 0.00 | 0.00 | 0.00 | 0.00 | bal. |
| 2 | 0.8 | 0.05 | 0.5 | 1.1 | 0.00 | 0.00 | 0.00 | 0.00 | 0.00 | bal. |
| 3 | 1.0 | 0.05 | 0.5 | 1.1 | 0.00 | 0.00 | 0.00 | 0.00 | 0.00 | bal. |
| 4 | 0.8 | 0.05 | 0.3 | 1.1 | 0.00 | 0.00 | 0.00 | 0.00 | 0.00 | bal. |
| 5 | 0.8 | 0.05 | 0.7 | 1.1 | 0.00 | 0.00 | 0.00 | 0.00 | 0.00 | bal. |
| 6 | 0.8 | 0.05 | 0.5 | 0.4 | 0.00 | 0.00 | 0.00 | 0.00 | 0.00 | bal. |
| 7 | 0.8 | 0.05 | 0.5 | 1.1 | 0.1 | 0.00 | 0.00 | 0.00 | 0.00 | bal. |
| 8 | 0.8 | 0.05 | 0.5 | 1.1 | 0.00 | 0.00 | 0.1 | 0.00 | 0.00 | bal. |
| 9 | 0.8 | 0.05 | 0.5 | 1.1 | 0.00 | 0.00 | 0.1 | 0.1 | 0.00 | bal. |
| 10 | 0.8 | 0.05 | 0.3 | 1.1 | 0.00 | 0.00 | 0.1 | 0.1 | 0.15 | bal. |
| comparative examples | | | | | | | | | | |
| 11 | 0.2 | 0.05 | 0.5 | 1.1 | 0.00 | 0.00 | 0.00 | 0.00 | 0.00 | bal. |
| 12 | 0.8 | 0.05 | 0.15 | 1.1 | 0.00 | 0.00 | 0.00 | 0.00 | 0.00 | bal. |
| 13 | 0.8 | 0.4 | 0.5 | 1.1 | 0.00 | 0.00 | 0.00 | 0.00 | 0.00 | bal. |
| 14 | 0.8 | 0.05 | 0.5 | 0.2 | 0.00 | 0.00 | 0.1 | 0.00 | 0.00 | bal. |
| 15 | 0.8 | 0.05 | 0.5 | 1.1 | 0.3 | 0.00 | 0.1 | 0.1 | 0.00 | bal. |

Bal. means balance.

TABLE 2

| Cladding No.. | Composition of the cladding material (mass %) | | | |
|---|---|---|---|---|
| | Si | Mg | Zn | Al |
| Examples | | | | |
| 1 | 0.02 | 2.1 | 1.5 | bal. |
| 2 | 0.15 | 2.1 | 1.5 | bal. |
| 3 | 0.02 | 3.0 | 1.5 | bal. |
| 4 | 0.02 | 2.1 | 0.7 | bal. |
| 5 | 0.02 | 2.1 | 1.2 | bal. |
| Comparative example | | | | |
| 6 | 0.3 | 2.1 | 1.5 | bal. |
| 7 | 0.02 | 1.5 | 1.5 | bal. |
| 8 | 0.02 | 2.1 | 0.2 | bal. |
| 9 | 0.02 | 2.1 | 2.5 | bal. |

By combining the core materials and the cladding material shown in Tables 1 and 2 and a brazing filler material JIS 4045 alloy), an aluminum brazing sheet for brazing (aluminum alloy composite material) as shown in FIG. 1 is manufactured. FIG. 1 is a cross sectional view of the aluminum brazing sheet. As shown in FIG. 1, an aluminum brazing sheet 4 is formed by laminating both surfaces of a core material 1 with a cladding material 2 and a brazing filler material 3. The following Tables 3 and 4 show a construction of composite materials combined with the core material, the cladding material and the brazing filler material. The composite material Nos. 1 to 14 shown in Table 3 are the examples of the present invention, and the composite material Nos. 15 to 23 shown in Table 4 are the comparative examples beyond the scope of the present invention.

In the manufacturing process, the composite materials was pressed up to 1 mm in thickness after a hot leveling rolling, and maintained for 2 hours at a temperature of 400° C./ increased at a heat rising rate of 40° C./hr, and then cooled at a cooling rate of 15° C./hr. These obtained composite materials were subjected to a test.

TABLE 3

| Composite brazing sheet No. | Core material | | Cladding material | | Brazing filler material | Total thickness of brazing sheet |
|---|---|---|---|---|---|---|
| | No. | Thickness (mm) | No. | Thickness (mm) | Thickness (mm) | (mm) |
| Examples | | | | | | |
| 1 | 1 | 0.8 | 1 | 0.1 | 0.1 | 1.0 |
| 2 | 2 | 0.8 | 1 | 0.1 | 0.1 | 1.0 |
| 3 | 3 | 0.8 | 1 | 0.1 | 0.1 | 1.0 |
| 4 | 4 | 0.8 | 1 | 0.1 | 0.1 | 1.0 |
| 5 | 5 | 0.8 | 1 | 0.1 | 0.1 | 1.0 |
| 6 | 6 | 0.8 | 1 | 0.1 | 0.1 | 1.0 |
| 7 | 7 | 0.8 | 1 | 0.1 | 0.1 | 1.0 |
| 8 | 8 | 0.8 | 1 | 0.1 | 0.1 | 1.0 |
| 9 | 9 | 0.8 | 1 | 0.1 | 0.1 | 1.0 |
| 10 | 10 | 0.8 | 1 | 0.1 | 0.1 | 1.0 |
| 11 | 2 | 0.8 | 2 | 0.1 | 0.1 | 1.0 |
| 12 | 2 | 0.8 | 3 | 0.1 | 0.1 | 1.0 |
| 13 | 2 | 0.8 | 4 | 0.1 | 0.1 | 1.0 |
| 14 | 2 | 0.8 | 5 | 0.1 | 0.1 | 1.0 |

TABLE 4

| Composite Material No. | Core Material | | Cladding material | | Brazing filler material | Total thickness of brazing sheet |
|---|---|---|---|---|---|---|
| | No. | Thickness (mm) | No. | Thickness (mm) | Thickness (mm) | (mm) |
| Comparative examples | | | | | | |
| 15 | 11 | 0.8 | 1 | 0.1 | 0.1 | 1.0 |
| 16 | 12 | 0.8 | 1 | 0.1 | 0.1 | 1.0 |
| 17 | 13 | 0.8 | 1 | 0.1 | 0.1 | 1.0 |
| 18 | 14 | 0.8 | 1 | 0.1 | 0.1 | 1.0 |
| 19 | 15 | 0.8 | 1 | 0.1 | 0.1 | 1.0 |
| 20 | 2 | 0.8 | 6 | 0.1 | 0.1 | 1.0 |

TABLE 4-continued

| Composite Material No. | Core Material No. | Thickness (mm) | Cladding material No. | Thickness (mm) | Brazing filler material Thickness (mm) | Total thickness of brazing sheet (mm) |
|---|---|---|---|---|---|---|
| 21 | 2 | 0.8 | 7 | 0.1 | 0.1 | 1.0 |
| 22 | 2 | 0.8 | 8 | 0.1 | 0.1 | 1.0 |
| 23 | 2 | 0.8 | 9 | 0.1 | 0.1 | 1.0 |

Also, the following tests were conducted on each of composite materials composed of incorporation shown in Tables 3 and 4.

(a) Brazing Test considering simplicity and quantization of estimation, the brazing property was estimated by a flow coefficient according to dropping test.

The brazing surface of each of composite materials was coated with 5 g/m² of Nocolo flux and dried, and then, heated for five minutes at a temperature of 600° C. under a nitrogen atmosphere with not more than 200 weight ppm of oxygen concentration and −40° C. of a dew point temperature, low coefficient was measured.

The following Tables 5 and 6 show the estimative results of the brazing property test. As shown in Tables 5 and 6, each example according to the present invention has excellent brazing property, but the composite material No. 19 of the comparative examples in which 0.3 wt % Mg is added to the core material had extremely low brazing property compared with that of the present invention.

(b) Tension Test

A composite material heated in the same manner as the above-mentioned brazing test was left for 7 days at a room temperature, and then, the tension test was conducted. The results thereof are shown in Tables 5 and 6. All the examples of the present invention had the high strength exceeding 160 MPa after the brazing. Meanwhile, the composite material No. 15 of the comparative examples in which Si of the core material is less than the lower limit, the composite material No. 16 of the comparative examples in which Cu of the core material is less than the lower limit, and the composite material No. 18 of the comparative examples in which Mn of the core material is less than the lower limit had the low strength.

(c) Corrosion Test on the Cladding Material

The corrosion test on the cladding material of a composite material in the same manner as the above-mentioned brazing test was conducted by using an artificial water (300 weight ppm Cl, 100 weight ppm $SO_4$, and 5 weight ppm Cu). First, the composite material was immerged into the artificial water of 88° C. for 8 hours, and then, at this state, left for 16 hours at a room temperature with a heater turned off. The corrosion test in such order was conducted for 30 days. The results thereof are shown in Tables 5 and 6.

The corrosion on the cladding material of the examples according to the present invention was stopped within the cladding material so that excellent corrosion resistance was obtained, but in the composite material No. 22 of the comparative examples in which Zn of the cladding material is less than the lower limit, the corrosion reaching to the core material occurred, thereby degrading the corrosion resistance.

(d) Brazing Corrosion Test

A composite material heated in the same manner as the above-mentioned brazing test was successively tested for 250 hours by CASS. The results thereof are shown in Tables 5 and 6.

The examples according to the present invention had excellent corrosion resistance in the brazing filler material, while in the composite material No. 17 of the comparative examples in which Fe of the core material exceeds the upper limit and the composite material No. 19 of the comparative examples in which Mg of the core material exceeds the upper limit, the corrosion resistance was degraded.

(e) Formability

The formability of the composite material before brazing was estimated by the Erichsen test and an angled cylinder drawing test. All the examples according to the present invention had excellent formability, but in the composite material No. 17 of the comparative examples in which Fe of the core material exceeds the upper limit and the composite material No. 20 of the comparative examples in which Si of the cladding material exceeds the upper limit, formability is significantly degraded, and in the composite material No. 21 in which Mg of the cladding material is less than the lower limit and the composite material No. 23 in which Zn of the cladding material exceeds the upper limit, the reduction of formability occurred.

TABLE 5

| Composite material No. | Brazing property (flow coefficient) (%) | Tensile strength after brazing MPa | Corrosion depth in the cladding material side (mm) | Corrosion depth in the brazing filler material side (mm) | Formability | |
|---|---|---|---|---|---|---|
| | | | | | Erichsen (mm) | Cylinder drawing test mm |
| Examples | | | | | | |
| 1 | 70 | 165 | 0.06 | 0.16 | 10.7 | 10.8 |
| 2 | 70 | 172 | 0.06 | 0.16 | 10.6 | 10.7 |
| 3 | 70 | 178 | 0.06 | 0.16 | 10.6 | 10.7 |
| 4 | 70 | 162 | 0.06 | 0.16 | 10.6 | 10.6 |
| 5 | 70 | 182 | 0.06 | 0.16 | 10.6 | 10.7 |
| 6 | 70 | 160 | 0.06 | 0.16 | 10.7 | 10.8 |
| 7 | 67 | 182 | 0.06 | 0.17 | 10.6 | 10.7 |
| 8 | 70 | 175 | 0.06 | 0.13 | 10.6 | 10.7 |

TABLE 5-continued

| Composite material No. | Brazing property (flow coefficient) (%) | Tensile strength after brazing MPa | Corrosion depth in the cladding material side (mm) | Corrosion depth in the brazing filler material side (mm) | Formability Erichsen (mm) | Cylinder drawing test mm |
|---|---|---|---|---|---|---|
| 9 | 72 | 174 | 0.06 | 0.13 | 10.6 | 10.7 |
| 10 | 72 | 174 | 0.06 | 0.16 | 10.6 | 10.7 |
| 11 | 70 | 175 | 0.06 | 0.16 | 10.6 | 10.7 |
| 12 | 70 | 184 | 0.06 | 0.16 | 10.7 | 10.8 |
| 13 | 70 | 168 | 0.06 | 0.16 | 10.8 | 10.9 |
| 14 | 70 | 170 | 0.06 | 0.16 | 10.7 | 10.8 |

TABLE 6

| Composite material No. | Brazing property (flow coefficient) (%) | Tensile strength after brazing MPa | Corrosion depth in the cladding material side (mm) | Corrosion depth in the brazing filler material side (mm) | Formability Erichsen (mm) | Cylinder drawing test mm |
|---|---|---|---|---|---|---|
| Comparative examples | | | | | | |
| 15 | 70 | 158 | 0.06 | 0.16 | 10.6 | 10.7 |
| 16 | 70 | 154 | 0.06 | 0.16 | 10.6 | 10.7 |
| 17 | 70 | 174 | 0.06 | 0.20 | 10.0 | 10.2 |
| 18 | 70 | 155 | 0.06 | 0.16 | 10.7 | 10.8 |
| 19 | 30 | 202 | 0.06 | 0.25 | 10.6 | 10.7 |
| 20 | 70 | 174 | 0.06 | 0.16 | 10.1 | 10.2 |
| 21 | 70 | 165 | 0.06 | 0.16 | 10.3 | 10.4 |
| 22 | 70 | 165 | 0.18 | 0.16 | 10.8 | 10.9 |
| 23 | 70 | 174 | 0.06 | 0.16 | 10.3 | 10.4 |

Second Experimental Test

Next, a second experimental test of the present invention will be described. First, a composite materials having the composition of the composite material No. 2 shown in Table 3 was conducted with a cold rolling, and then, materials with the hardness ratios of the cladding materials/the core materials as shown in Table 7 were obtained through regulation of an annealing condition. In addition, these hardness ratios were yielded in a given cross section of the material by measuring micro Vickers hardness at the center portions of the cladding material and core material. This material was of 1.0 mm in thickness.

Figure 2A:
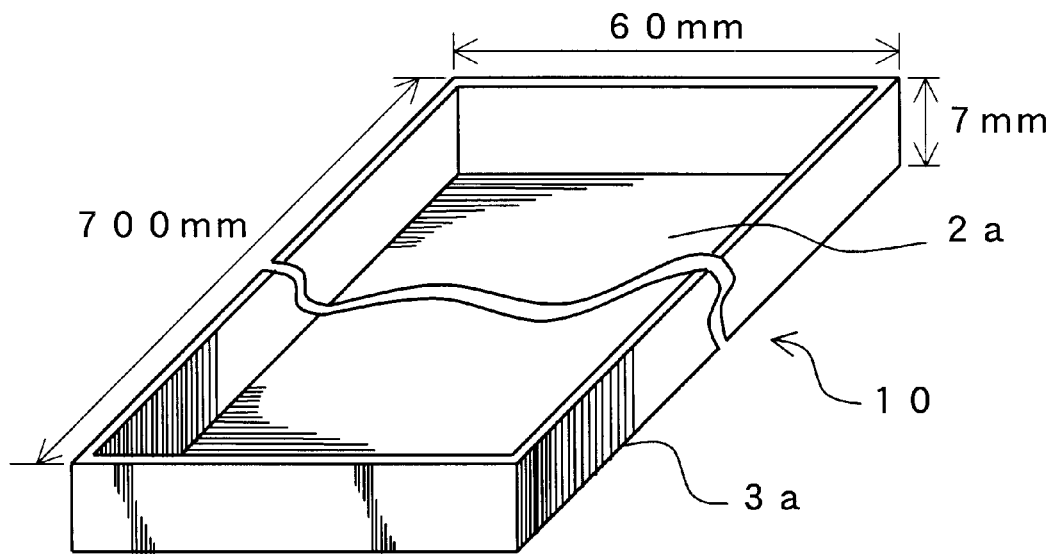
FIG. 2A is a perspective view showing a formed dimension of a composite material formed in a box-shape.
Figure 2B:
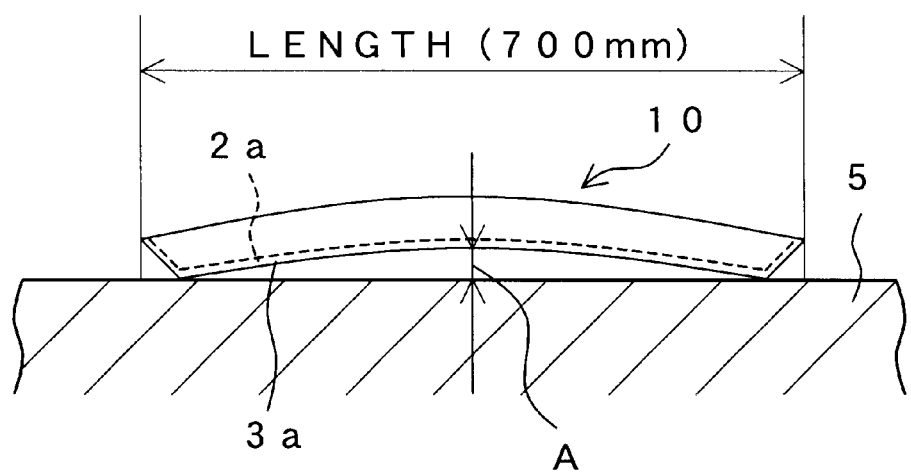
FIG. 2B is a diagram showing a method for measuring an amount of spring back in the formed workpiece.

FIG. 2A shows a perspective view showing a formed dimension of a composite material formed in a box-shape, and FIG. 2B is a diagram showing a method for measuring an amount of spring back in the formed workpiece. Furthermore, a unit of numerals shown in FIG. 2A is mm.

With using each material shown in Table 7, a cubical formed part 10 was obtained by forming at predetermined conditions with a mold in order that a cladding material face 2a becomes an inner:surface thereof and a brazing filler material face 3a becomes an outer surface thereof. As shown in FIG. 2B, the formed part 10 was placed on a platen 5, etc. with the brazing filler material face 3a faced toward the platen, and the amount of spring back from the normal processing at a spring back measuring portion A was measured. The results are shown in Table 7.

In addition, in order to perform the assembling before brazing, as shown in Table 7, it is better as the amount of spring back are more little, and its allowable range is not more than 1.0 mm.

TABLE 7

| Composite brazing sheet No. | Hardness ratio of cladding material to core material | Amount of spring back (mm) |
|---|---|---|
| Example | | |
| 24 | 0.8 | 0.1 |
| 25 | 1.0 | 0.2 |
| 26 | 1.3 | 0.6 |
| 27 | 1.5 | 1.0 |
| Comparative example | | |
| 28 | 1.7 | 1.5 |
| 29 | 2.0 | 2.0 |

As shown in Table 7, the amount of spring back of the composite material Nos. 24 to 27 of the examples are not more than 1.0 mm and within the allowable range. Meanwhile, because of the hardness ratios of the cladding material and the core material of the composite material Nos. 28 and 29 of the comparative examples exceeded the upper limit of the present invention, the amount of spring back exceeded the allowable range.

As described above, according to the present invention, the aluminum brazing sheet composed of aluminum alloy composite material having the high strength, the high corrosion resistance, the high brazing property and the improved formability can be obtained.

What is claimed is:

1. An aluminum brazing sheet comprising:
   a core material formed of an aluminum alloy having a composition restricting Mg to less than 0.3 wt % and Fe to not more than 0.2 wt %, and containing more than 0.2 wt % and not more than 1.0 wt % of Cu, 0.3 to 1.3 wt % Si, 0.3 to 1.5 wt % of Mn and the balance of Al and inevitable impurities
   a brazing filler material formed on one surface of the core material by Al—Si based aluminum alloy; and
   a cladding material formed on the other surface of said core material, said cladding material being formed of an aluminum alloy containing less than 0.2 wt % of Si, 2.0 to 3.5 wt % of Mg, not less than 0.5 wt % and less than. 2.0 wt % of Zn and the balance of Al and inevitable impurities, wherein a ratio of the cladding material hardness to the core material hardness is not more than 1.5.

2. The aluminum brazing sheet according to claim 1, wherein said core material further contains not more than 0.3 wt % of Cr.

3. The aluminum brazing sheet according to claim 1, wherein said core material further contains not more than 0.3 wt % of Zr.

4. The aluminum brazing sheet according to claim 2, wherein said core material further contains not more than 0.3 wt % of Zr.

5. The aluminum brazing sheet according to claim 1, wherein said core material further contains not more than 0.3 wt % of Ti.

6. The aluminum brazing sheet according to claim 2, wherein said core material further contains not more than 0.3 wt % of Ti.

7. The aluminum brazing sheet according to claim 3, wherein said core material further contains not more than 0.3 wt % of Ti.

8. The aluminum brazing sheet according to claim 4, wherein said core material further contains not more than 0.3 wt % of Ti.

* * * * *

UNITED STATES PATENT AND TRADEMARK OFFICE
CERTIFICATE OF CORRECTION

PATENT NO.     : 6,403,232 B1
DATED          : June 11, 2002
INVENTOR(S)    : Okamoto et al.

It is certified that error appears in the above-identified patent and that said Letters Patent is hereby corrected as shown below:

<u>Title page,</u>
Item [30], the Foreign Application Priority Data has been omitted. Item [30] should read:
-- [30]     Foreign Application Priority Data
   Jul. 28, 2000 (JP) ............................... 2000-229862 --

Signed and Sealed this

Twenty-ninth Day of October, 2002

*Attest:*

*Attesting Officer*

JAMES E. ROGAN
*Director of the United States Patent and Trademark Office*